US008727785B2

(12) United States Patent
Oddsson

(10) Patent No.: US 8,727,785 B2
(45) Date of Patent: May 20, 2014

(54) METHOD AND DEVICE FOR GRAVITY LIKE SIMULATION OF NATURAL BALANCE MOVEMENTS

(75) Inventor: Lars I. E. Oddsson, Edina, MN (US)

(73) Assignee: Lars Oddsson, Edina, MN (US)

( * ) Notice: Subject to any disclaimer, the term of this patent is extended or adjusted under 35 U.S.C. 154(b) by 457 days.

(21) Appl. No.: 12/667,994

(22) PCT Filed: Jul. 30, 2008

(86) PCT No.: PCT/US2008/009190
§ 371 (c)(1),
(2), (4) Date: Jan. 6, 2010

(87) PCT Pub. No.: WO2009/017747
PCT Pub. Date: Feb. 5, 2009

(65) Prior Publication Data

US 2010/0210978 A1 Aug. 19, 2010

Related U.S. Application Data

(60) Provisional application No. 60/962,573, filed on Jul. 30, 2007.

(51) Int. Cl.
*G09B 9/00* (2006.01)

(52) U.S. Cl.
USPC .......................................... 434/258; 434/247

(58) Field of Classification Search
USPC .................................... 434/258; 482/92–137
See application file for complete search history.

(56) References Cited

U.S. PATENT DOCUMENTS 6,162,189 A 12/2000 Girone et al.
2004/0248713 A1 * 12/2004 Campanaro et al. .......... 482/123
2006/0287173 A1 12/2006 Guadagno

OTHER PUBLICATIONS

Oddsson et al., A Rehabilitation Tool for Functional Balance Using Altered Gravity and Virtual Reality. Journal of NeuroEngineering and Rehabilitation, Jul. 10, 2007, pp. 1-7, vol. 4, No. 25; BioMed Central, United Kingdom.

Lars I.E. Oddsson, et al., “A Rehabilitation Tool for Functional Balance Using Altered Gravity and Virtual Reality,” IEEE Engineering in Medicine and Biology Journal, with IEEE International Workshop on Virtual Rehabilitation,(Aug. 29-30, 2006), pp. 193-196; Aug. 29, 2006, New York, USA.

* cited by examiner

*Primary Examiner* — Timothy A Musselman
(74) *Attorney, Agent, or Firm* — Barbara A. Wrigley; Oppenheimer Wolff & Donnelly LLP

(57) ABSTRACT

We present a tool that can enhance the concept of BWS training by allowing natural APAs to occur mediolaterally. While in a supine position in a 90 degree tilted environment built around a modified hospital bed, subjects wear a back-pack frame that is freely moving on air-hearings, as a puck on an air hockey table, and attached through a cable to a pneumatic cylinder that provides a load that can be set to emulate various G-like loads. Veridical visual input is provided through two 3-D automultiscopic displays that allow glasses free 3-D vision representing a virtual surrounding environment that may be acquired from sites chosen by the patient. Two groups of 12 healthy subjects were exposed to either strength training alone or a combination of strength and balance training in such a tilted environment over a period of four weeks.

23 Claims, 8 Drawing Sheets

METHOD AND DEVICE FOR GRAVITY LIKE SIMULATION OF NATURAL BALANCE MOVEMENTS

CROSS REFERENCE TO RELATED APPLICATIONS

This application is a U.S. national stage application of international application Serial No.: PCT/US2008/009190, filed Jul. 30, 2008, which claims the benefit of priority to U.S. Provisional Patent Application Ser. No.: 60/962,573, filed Jul. 30, 2007.

This invention was made with U.S. Government Support under Contract No. HD050655 awarded by the National Institutes of Health. The U.S. Government has certain rights in the invention.

FIELD OF THE INVENTION

The present invention relates to the field of functional balance training , methods and devices using altered gravity and virtual reality.

BACKGROUND OF THE INVENTION

Balance control is the foundation of our ability to move and function independently. Various neurological diseases and injuries to the brain, spinal cord and other parts of the motor control system may lead to immobility loss of function and quality of life. With increasing age, the occurrence of clinical balance problems and the natural deterioration of balance function will increase the risk of balance loss and falls. In fact, falls are the leading cause of accidental death in the elderly population with over 11,000 deaths as a result of falls each year. Severe head injuries, hip and other fractures are common consequences of a fall that may lead to serious handicap. Every year some 350,000 hip fractures occur in the US of which more than 90 percent are the consequence of falls. Hip fractures are the leading fall-related injury that causes prolonged hospitalization and 25% of elderly persons who sustain a hip fracture die within six months of the injury. Hip fracture survivors experience a 10 to 15 percent decrease in life expectancy and a significant decline in overall quality of life. The scope of this problem is expected to grow as the number of elderly individuals will increase dramatically over the next 25 years.

Early mobilization following any injury or disease that leads to immobility is crucial for recovery and in the case of hip fractures, early ambulation has even been shown to be directly predictive of extended survival. Gait training using partial body weight support (BWS) is a neurorehabilitation technique that is becoming increasingly popular and is being used to enhance locomotor recovery following a range of motor disorders related to brain injury including stroke, spinal cord injury, cerebral palsy, Parkinson's disease as well as for early mobilization following total hip arthroplasty. However, improvement in balance function following BWS training only occurs in patients with minimal function prior to treatment suggesting that BWS training is not sufficiently challenging for more functional patients. Consequently, the challenge to the balance is either too small to stimulate improvement or is not sufficiently specific to balance function. Another issue associated with the BWS technique is that the harness supporting the subject decreases the need for natural automatic postural adjustments that are required for independent gait because the harness provides a lateral as well as vertical support. During gait the main site for an active control of balance is the step-to-step mediolateral placement of the foot. When supported by a harness the patient's mediolateral movement will be limited by a medially directed reaction force component that will help stabilize the body in the frontal plane and decrease or even eliminate the need for automatic postural adjustments that are required for independent gait. This restriction on automatic postural adjustments limits the full advantage of unloaded gait training.

Therefore, a need exists for a device that incorporates the principals of BWS but overcomes the problems associated with a harness that decreases the need for natural postural adjustments including mediolateral movements. There also exists a need for a device and method that provides unloaded gait training that allows automatic postural adjustments. There is also a need for a device and method that overcomes the aforementioned limitations that is completely mobile and therefore easily transportable into a patient's hospital room or placed in an outpatient clinic or in a patient's home, if necessary. The benefits of such a device would also extend to injured athletes to enhance their functional rehabilitation.

BRIEF SUMMARY OF THE INVENTION

The present invention overcomes the aforementioned problems by providing a device and method that allows a patient to incorporate natural automatic postural adjustments directly in the BWS training. We have discovered that upright balance function improves after training in a 90 degree tilted visual environment with the subject in a supine position strapped to a device that freely moves on air-bearings and a gravity-like load of preferred magnitude provided with a weight stack. For movements in the frontal plane, this tilted room environment requires the subject to perform associated postural adjustments as if in an upright environment. The foregoing is accomplished by providing a bed and exercise module including a modified hospital bed with an attachment for various exercise devices such as a treadmill, stepper, cycle or balance board; a virtual environment module that includes three-dimensional displays; a gravity force module that includes an open- or closed-loop control pneumatic force actuator system; a linear bearing assembly; and an air-bearing and support module including a light-weight mounting frame or harness with air bearings, back-pack harness and substantially flat surface plate. The device and method of the present invention may also be used for functional balance training for athletes, in-home gyms, and for gaming and entertainment purposes.

DETAILED DESCRIPTION OF THE INVENTION

Figure 1:
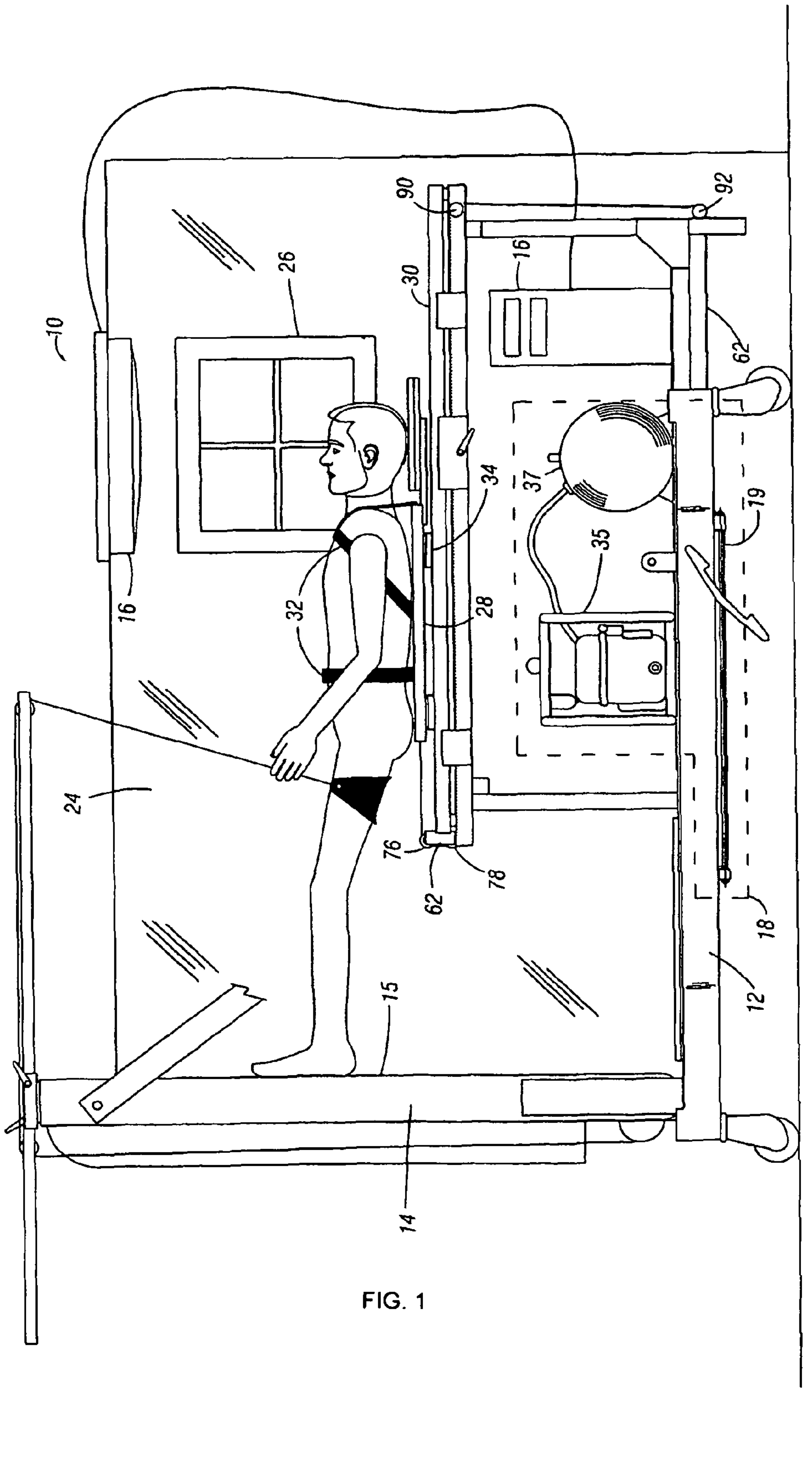
FIG. 1 schematic illustration of the device in accordance with the present invention.

Referring to FIG. 1, the device 10 in accordance with the present invention includes a support and exercise module including a wheel-frame of a standard hospital bed 12 with, in addition to a flat "floor" surface 15, an attachment for various exercise devices such as a treadmill 14, stepper, cycle or balance board; a virtual environment module 16 that includes one or more three-dimensional displays; a gravity force module that includes an open- or closed-loop control pneumatic or other force actuator system 18; an air-bearing and support module 20 including a light-weight frame 28 with a harness 32 or other attachment system such as Velcro and the like-, air bearings 34 thereon and a substantially flat surface plate 30 or other system to provide minimal friction movement; and a linear bearing assembly 67. The virtual environment may optionally include a graphics computer 16 with a head mounted display (not shown) and a multi-camera still-image acquisition system.

Patient Support and Exercise Module

Referring to FIG. 1, a standard hospital bed 12 may be modified for the proposed system. The bed 12 includes a welded, one-piece steel frame that supports up to 750 pounds with an optional multi-function electric operation to adjust head, feet and high-low position. Modifications include attaching mounts for the additional system modules including the virtual environment 16, G-force 18 and air-bearing and support 20 modules. In addition, the foot rest end of the bed 12 is reinforced with an aluminum platform holding attachment mechanisms for the different exercise devices that can be connected to the system. These exercise devices may include a mini-stepper, a balance board, a cycle ergometer, a treadmill, and other similar devices known to those skilled in the art. Two longitudinal support bars may optionally be mounted above the bed to allow elastic and/or non-elastic cords providing constant-force support against gravity through an active or passive mechanism to be attached to each limb as required under conditions when the patient requires assistance during gait and other exercise. Alternatively, the support and exercise module may optionally be a simple table or substantially flat surface that is connected to a set of adjustable legs having wheels. The table or modified bed is constructed to support subjects of varying weights and includes a flat non-friction surface plate 28. As depicted in FIG. 1 the subject wears a back-pack-like frame 28 that includes air-bearings 34 allowing low-friction mediolateral motion. The "room" contains common physical objects that have a visual "polarity" with respect to the direction of gravity. The patient is viewing at least one optional automultiscopic display 16 that shows three-dimensional images. The display shows a window 26 in a virtual room that surrounds the patient. Images of the patient's own home, office, or other familiar environment can also be shown. In an alternative embodiment, one or more walls can surround the table or modified bed to effect a "room"-like environment with objects having visual polarity placed in the room as described hereinafter.

Virtual Environment Module

A class of disorientation illusions occur in most individuals when placed in a 90 or 180 degrees tilted room that contains "polarized" objects meaning that they are familiar to the subject and that they have tops and bottoms that align with our common perception of vertical in relation to the direction of gravity, for example tables, chairs, cups on tables etc. In this environment some 90% of subjects experienced the illusion of being upright with respect to gravity illustrating that the perception of upright is heavily dominated by vision. Therefore, the design of the inventive system includes a virtual environment module for balance training and may include for example, at least one wall 24 or a plurality of walls that simulate a room built over the bed module. The room may include a window 26, a door, a wall-clock, a table with a table cloth, a wastebasket with some trash and framed pictures on the walls and other such desirable objects, which may be fastened in place to help convey the illusion to the subject of a vertical orientation, in other words "standing upright." In yet a further alternative embodiment, and as described in detail below, the patient may view an automultiscopic display 16 that shows three-dimensional images, such as images of the patient's own home, office, or other familiar environment. Similar images can be displayed through a stereoscopic head-mounted display that provides an immersed 3D environment. While in a supine position on the bed, patients perceive they are standing in the room while attached to a lightweight frame 28 that is in operable communication with and thereby connected to the surface plate 30 as described in detail below.

Figure 2:
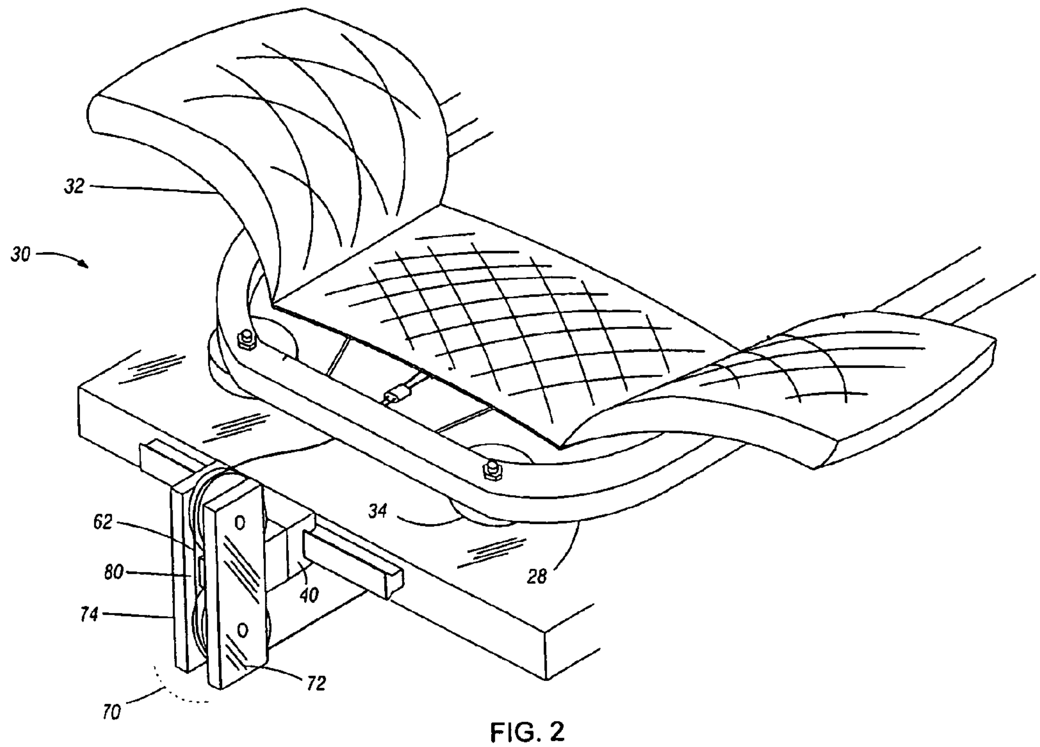
FIG. 2 is a perspective view of the support frame and linear bearing attachment in accordance with the present invention.
Figure 3:
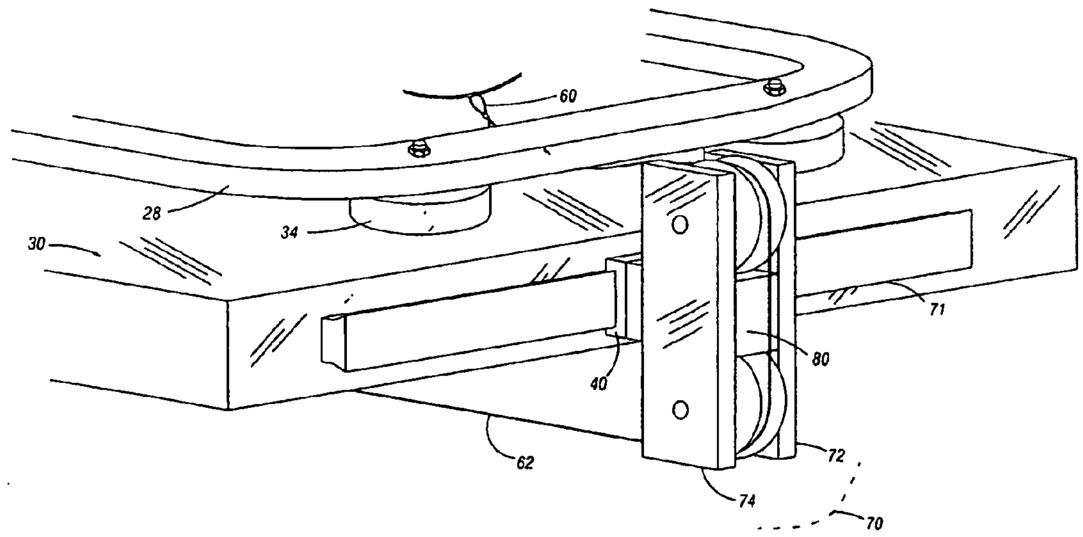
FIG. 3 is a detailed view of the support frame, air bearings, and support surface in an alternative view of the present invention.
Figure 4:
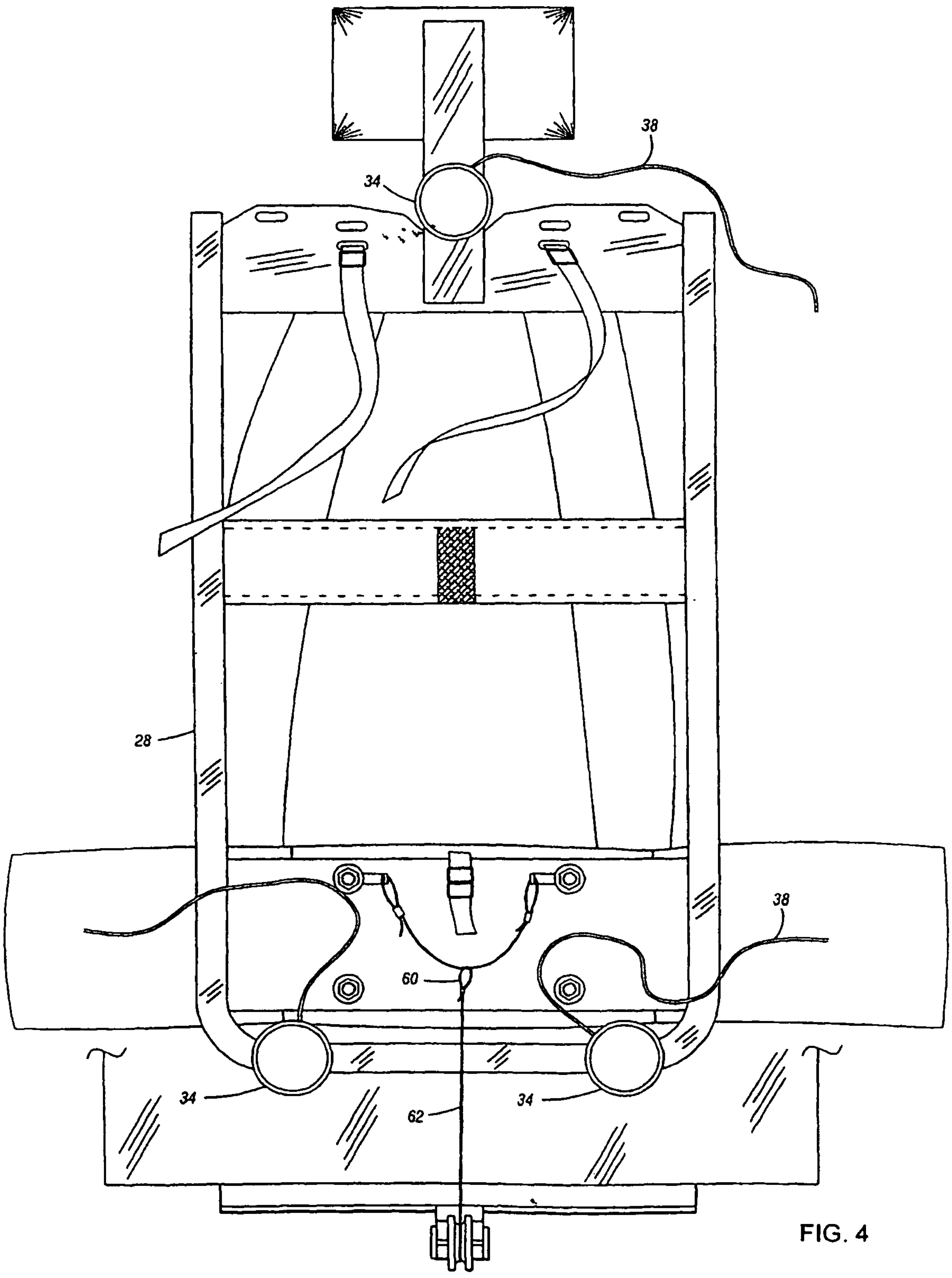
FIG. 4 is a top plan view of the back of the frame showing air bearing detail in accordance with the present invention.
Figure 8:
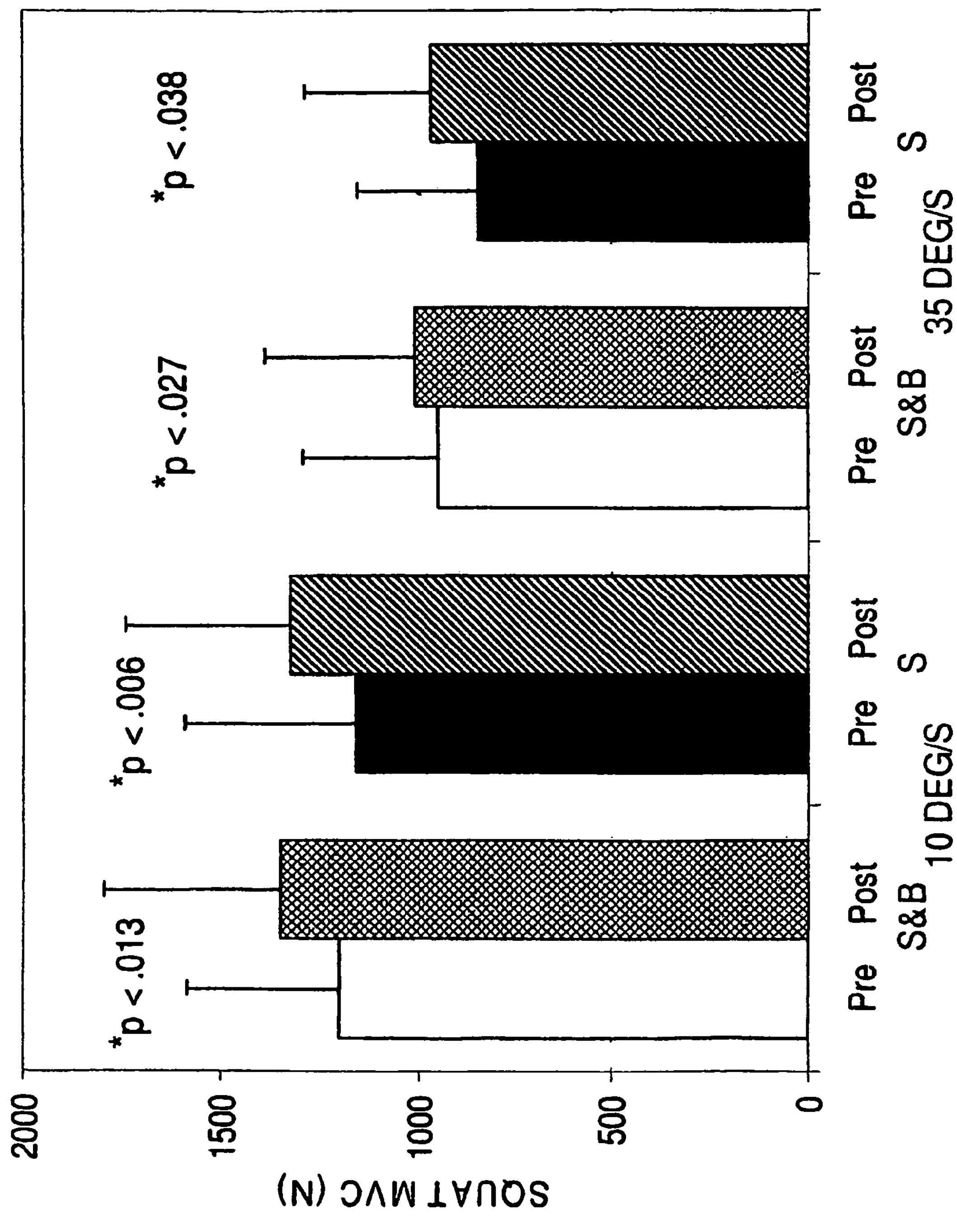
FIG. 8 depicts pre- and post-training data of subjects' Maximum Voluntary Contraction strength (MVC) tested during a full body squat extension.

Referring to FIGS. 2-4, the light weight frame 28 includes a harness 32 into which a patient is strapped. The frame 28 and harness 32 comprise a modified back-pack. The frame 28 includes friction-free air-bearings 34. A source of compressed air 35 feeds the air-bearings 34 via tubing 38 allowing the patient to move freely in the frontal plane, similar to when in upright standing. As best seen in FIGS. 2, 3 and 8 the light weight frame 28 is attached to a cable 62 that runs through a pulley system 76, 78, 90, 92 which is operably connected to a linear bearing 40 and to the pressure controlled pneumatic linear force actuator 19 which is capable of being set to provide different levels of a gravity-like force to the cable 62 that the subject must balance against to remain "upright." The cable 62 transmits the force to the frame 28 and thereby to the subject who while attached to the frame 28 must resist the force. The cable-frame attachment 60 is near the level of the lower lumbar back of the subject, the approximate location of the center of gravity along the longitudinal body axis when standing, and at the mediolateral midline of the body. The system is structured such that cable 62 runs between the legs of the subject. The linear bearing 40 allows near friction-free side to side motion thereby nulling out any mediolateral force vectors that are generated when the subject moves from side to side. This ensures that the gravity-like force is perpendicular to the support surface of the system, just like the direction of real gravity is perpendicular to the level ground. Although standing balance must be maintained the subject cannot fall to the ground thus providing a safe environment for functional balance training tasks.

In a further alternative embodiment, the Virtual Environment Module may include a multi-camera still-image display for balance training using three-dimensional automultiscopic displays. Visual cues to convey a perception of being in an upright environment are provided through state of the art display techniques with 3-D images of a virtual environment. Typically, stereoscopic 3-D displays require polarized or shutter glasses to deliver the projected images separately to each eye. Inconvenience, often discomfort, and, in the case of shutter glasses, cost, are some of the reasons that eyewear-based 3-D displays are far from practical. Additionally, stereoscopic systems render 3-D environment from one single viewpoint thus making any viewer movement in front of the screen unnatural (static 3-D objects rotate with lateral head motion). Automultiscopic displays require no glasses and project multiple views; a viewer can clearly experience depth and even see a little around objects. These displays are capable of projecting several, typically nine (based on nine different images), views of a 3-D scene. The present invention may optionally use two- and three-dimensional virtual reality systems having displays that can be placed in front of the subject and/or on the side, or both in front and the side, or so called Head Mount Displays worn by the subject. Still images displayed on these screens represent virtual "Windows" to an outside environment or show other surrounding environment and thereby promote a visually induced reorientation illusion where subjects perceive themselves as being upright with respect to gravity.

G-Force Module

The G-Force Module includes a pressure controlled pneumatic linear force actuator system 18, which includes a compressor 35, a pneumatic linear actuator 18, an electro-pneumatic pressure control valve (not shown) and a motion control PCI board (not shown). In an alternative embodiment, the linear force actuator may comprise a simple weight stack so long as it is capable of exerting a pseudo-gravitational force on the subject. The pneumatic actuator may be of "sure-fit" kind meaning that it has NFPA (National Fluid Power Association) industry-standard mounting footprint to ensure easy interchangeability with the ability to handle high forces. The bore diameter is 2 ½ to provide up to ~300 lbs of force at 50 psi air pressure for the proposed model actuator. Compressed air is provided from the on-board air compressor 35 or through a wall outlet commonly available in hospital treatment rooms as in the case in which the present invention is being used to rehabilitate a patient. The actuator is double acting, i.e. it has two compressed air ports. The first extends in the "push" direction and serves to supply compressed air to the air bearings 34. The second retracts in the "pull" direction which exerts force via cable 62 on the subject through frame 28 worn by the subject. The actuator allows constant pressure (force) control by using an electro-pneumatic pressure control valve, known to those skilled in the art. The pressure-control valve converts an electrical signal proportionally into pneumatic pressure allowing for closed-loop control of pneumatic pressure or force electronically. The proposed valve has an integral pressure sensor for closed-loop control allows a flow rate of over 28 SCFM, output pressure up to 150 psi, and a hysteresis of less than one psi. The motion control PCI card will be mounted in the PC that will be running servo tuning and analysis software for proportional control of the force module. The PCI card and software package supports advanced PID compensation with velocity and acceleration if needed for an improved control of the force module.

In yet a further alternative embodiment an open-loop air pressure control system may be employed. The open-loop control system includes the foregoing air compressor and a control valve system but further includes an air tank 37 connected in series with the pneumatic actuator 18. Those skilled in the art will appreciate that in this alternative embodiment the force output of the actuator is passively regulated. The open-loop control system with the added air tank provides a substantially larger volume than the closed-loop control system alone and better "absorbs" fluctuations in applied G-force level during movements by the subject. A given change in position of the piston in the air cylinder due to vertical subject movements will be "diluted" across the larger volume when the tank is present and G-force fluctuations will therefore be smaller. As a result, the subject is exposed to a more constant load as set with the control valve.

Air-Bearing Support Frame Module

Figure 5:
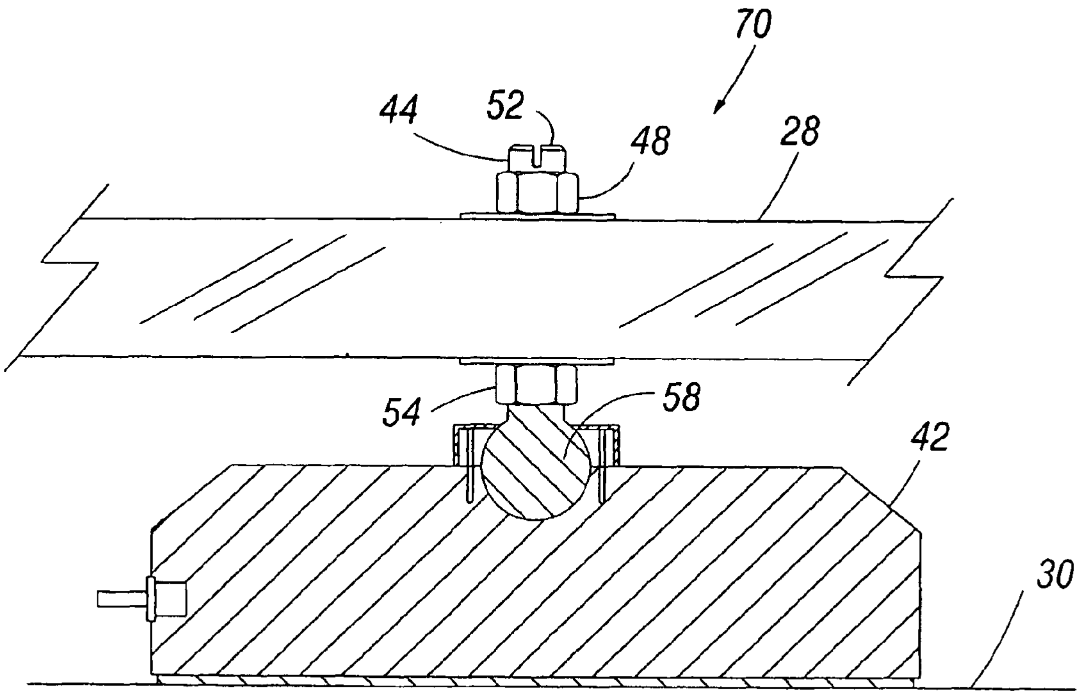
FIG. 5 is a schematic view of the air bearing in accordance with the present invention.
Figure 6:
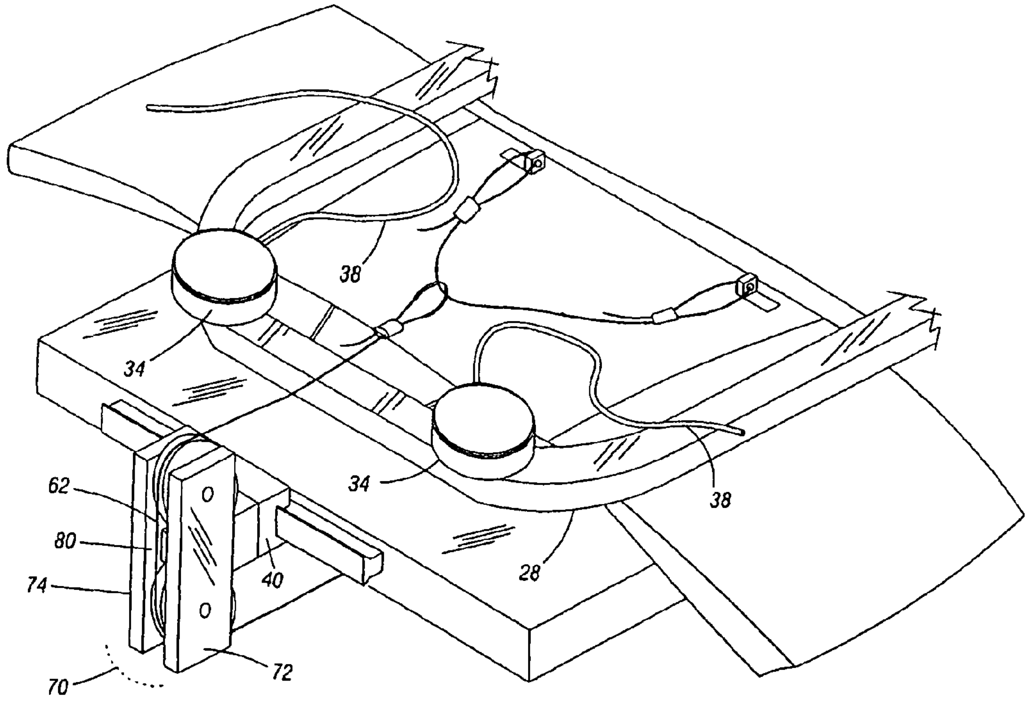
FIG. 6 is a perspective detailed view of the back of the frame attached by a pulley system to the linear bearing in accordance with the present invention.

Referring to FIGS. 2-6 a light-weight frame 28 including harness 32 that is wearable by and attached to a subject. Light-weight materials from which the frame 28 may be constructed include aluminum, plastic, titanium and the like. The frame 28 may comprise a modified back-pack. Referring to FIGS. 5-6 the frame 28 includes at least one air bearing 34 that allows the subject frictionless movement in the frontal plane. In an alternative embodiment, a plurality of air bearings 34 may be used. The bearing or bearings 34 include a porous face 42 and are approximately 2½ in diameter and support approximately 175 lbs each at 60 psi with 10 micron lift. The porous air bearings 34, typically made from carbon, provide an almost uniform air pressure across the entire bearing surface. The carbon surface 42 also provides greater bearing protection if there is an air supply failure, allows the bearings to be moved during air failure without damaging the support surface, and results in a stiff, stable crash tolerant bearing. The bearings 34 include a threaded stud 44 having first and second ends 52, 54. First end 52 provides the connection to frame 28. Second end 54 is operably connected to a ball joint 56 that is received by a ball joint depression 58 that moveably and rotatably seats the ball joint 56 allowing the bearing face 42 to become parallel with the support surface 30. The threaded stud 44 is operably connected via a lock nut 48 to the frame 28 Those of ordinary skill in the art will appreciate that the porous air bearings described above can be modified in known ways to attach to frame 28 without destroying functionality. The support surface 30 may be stainless steel, granite or any other hard flat surface known to those skilled in the art. The present invention includes three air bearings 34 operably connected to the frame 28 and placed in each corner of an isosceles triangle with its base perpendicular to the subject's long body axis and placed at the lower lumbar level and its vertex angle on the cervical region of the spinal column. This geometrical arrangement provides good stability and distribution of load as well as optimal contact with the flat support surface The air bearings 34 are operably connected to the compressor 35 of pressure controlled pneumatic linear force actuator system 18 via a series of tubing 38. Tubing 38 may be rigid or flexible and can be made of any material that allows connectability with the air bearings. The frame 28 is operably connected to cable 62 via a connecting element, such as cable eye 60 secured with a nut as best seen in FIG. 4. Cable 62 in connected via a pulley system to a linear bearing and to pressure controlled pneumatic linear force actuator system 18 that simulates a pseudo-gravitational force on the patient as hereinafter described. The linear bearing 40 nulls out mediolateral forces generated when the subject moves thereby permitting natural postural adjustments and unrestricted mediolateral movement to occur within the range of the linear bearing system described below.

Linear Bearing Assembly

Figure 7:
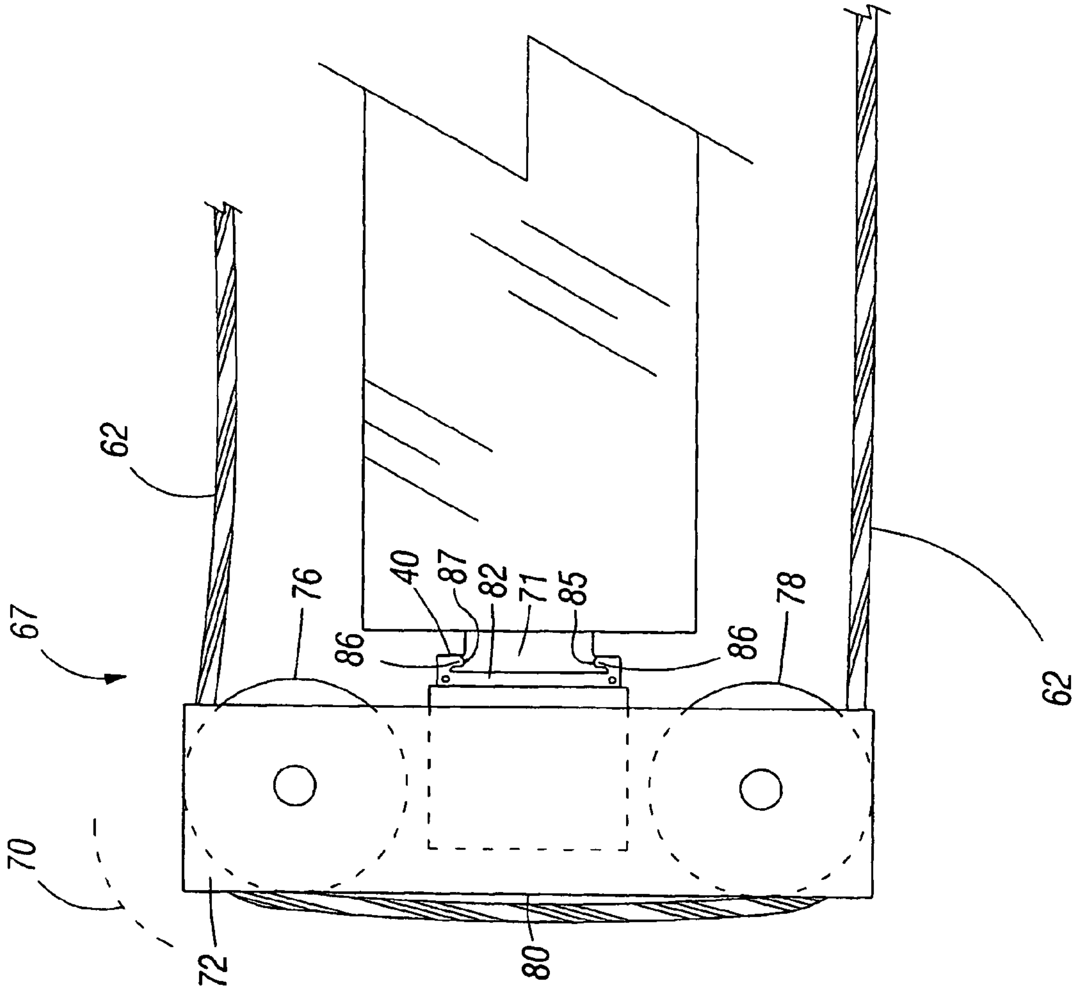
FIG. 7 is a side view showing detail of the linear bearing assembly.

Referring to FIG. 7, the linear bearing assembly 67 in accordance with the present invention is shown. The linear bearing assembly includes linear bearing 40 including a C-shaped in cross-section linear guide block 82 and linear rail 71 having top and bottom grooves 84, 85 along the length thereof. The top and bottom C-portions of linear guide block 82 include bearings therewithin 86 which travel in grooves 84, 85. Housing 70 is operably connected to linear bearing 40. Housing 70 includes two opposing faces 72, 74 that support first and second pulleys 76, 78 and form channel 80 on the backside. Cable 62 attached to frame 28 feeds through first pulley 76, through channel 80, and through second pulley 78, feeds horizontally underneath the full length of the top surface 30 through a third pulley 90 (best seen in FIG. 1) located below the top surface 30 near subject's head level and then feeds vertically downward to a level just above the hospital bed wheels to a fourth pulley 92. Cable 62 then operationally connects to the linear force actuator 19. Those of ordinary skill in the art will appreciate that any number of pulleys can be used in the system so long as cable 62 travels over a long distance. The use of a long travel for the cable helps decrease angular deviations during mediolateral body movement and sway in addition to the use of a linear bearing to null out remaining forces. When the patient commences training, for example walking on a treadmill, linear bearing 40 allows the patient to make unrestricted, automatic postural adjustments such as mediolateral movement due to the sliding motion of housing 70 attached to linear guide block 82 along linear rail 71.

Figure 10:
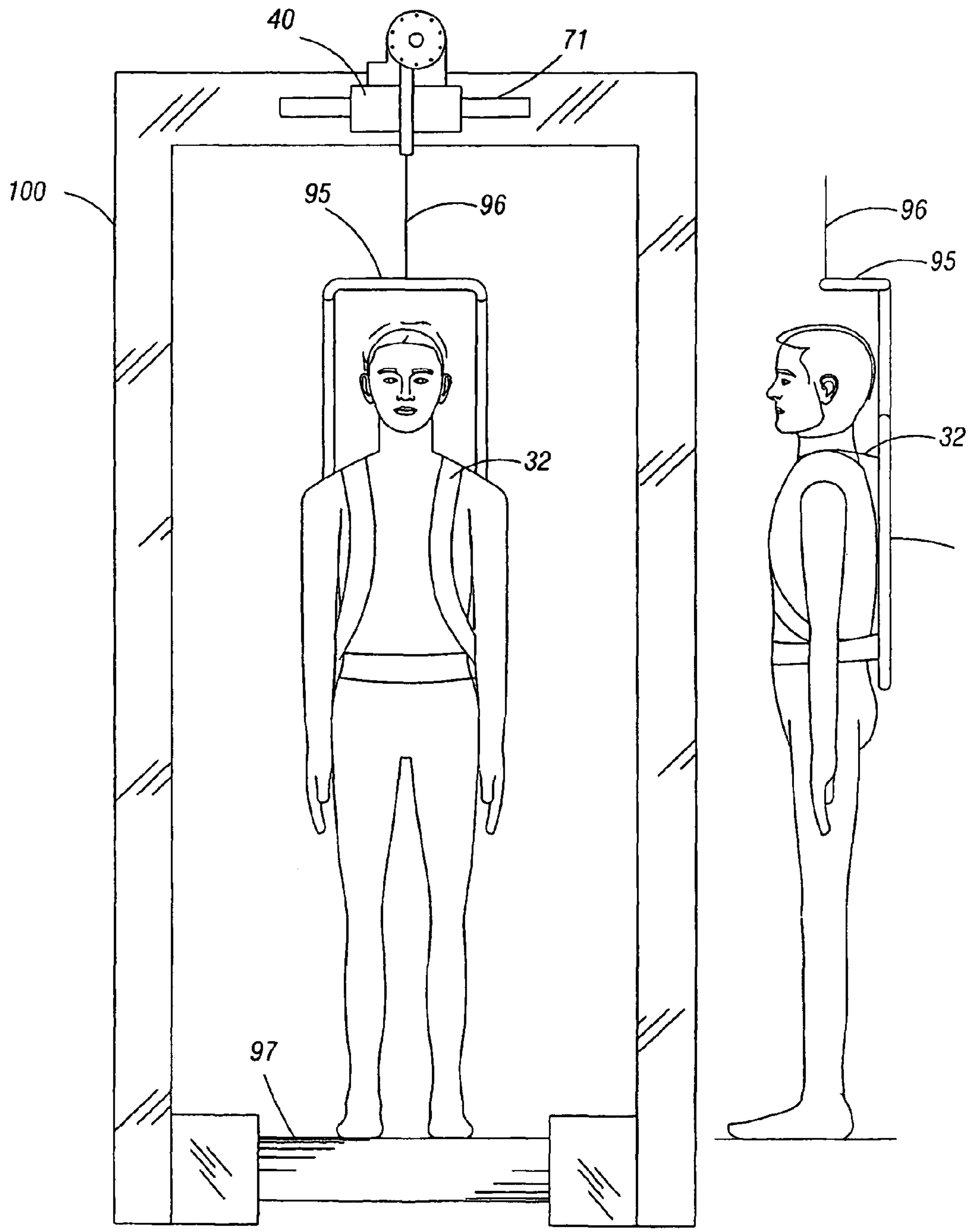
FIG. 10 is an illustration of the present invention adapted to be used with Body Weight Support techniques.

In yet a further embodiment of the system in accordance with the present invention the system can be adapted for use with BWS systems when the subject is in a standing position and upright with respect to gravity, as best seen in FIG. 10. The subject wears support frame 28 and harness 32 which is connected via a means of weight support 95 to cable 96. Alternatively, cable 96 can be directly attached to support frame 28. Cable 96 is operably connected to a linear bearing 40 which travels on linear rail 71. Cable 96 can be directly attached to linear bearing 40 or can be threaded through a housing with pulleys as described above. Rail 71 is supported by structural frame 100 constructed to attach to or surround treadmill 97 or other exercise tool. Alternatively structural frame 100 can be affixed to the floor. When the subject commences walking on treadmill 97, he or she is able to make automatic postural adjustments such as mediolateral movement due to the sliding motion of linear bearing 40 along linear rail 71, thus overcoming the problems of mediolateral support forces associated with BWS techniques. In the forgoing open-loop system, a lateral force will pull the linear guide block to a neutral position thereby nulling out the lateral force. In the forgoing open-loop system, a lateral force will pull the linear guide block to a neutral position thereby nulling out the lateral force. In an alternative embodiment, a closed-loop system includes a sensor that detects the lateral force or angle deviation away from the pseudo gravity line. An "error signal" activates a motor operably connected to the system that actively moves the linear bearing to a position where the lateral force or angular deviation is zero.

EXAMPLES

Two groups of healthy subjects; 1) Strength and Balance Training (hereinafter "S&B," consisting of 6 female and 6 male, 20-21 yrs, 170.1±9.2 cm, 68.6±10.8 kg individuals) and; 2) Strength Training (hereinafter "S," consisting of 5 female and 6 male, 19-25 yrs, 173.5±9.0 cm , 68.7±10.8 kg individuals) participated in the study. The S&B group performed "squats" in a tilted room environment, on a balance board that required them to balance in the mediolateral direction, whereas the S group performed squats without balance requirement (sliding on fixed rails and no balance board). The strength program was progressive (50%-75% of 1 RM) and each session consisted of 6 sets of 10 repetitions.

The following measures were conducted before and after training; 1) Maximal Voluntary Contraction (MVC) during an isokinetic squat extension (10 deg/s & 35 deg/s) using a computerized exercise system (CES, Ariel Dynamics, CA, USA); 2) Stationary stance on one leg with eyes open and with eyes closed while standing on a force platform. Ten trials of 30s standing were performed under each condition. Subjects rested between as needed between trials to minimize effects of fatigue. Subjects were instructed to stand as still as possible during each trial and to actively minimize their perceived body sway. Center of pressure (COP) data were recorded at 100 Hz. Summary statistics and Stabilogram-Diffusion parameters were extracted from the COP data.

FIG. 8 shows maximum isokinetic strength before and after training in the tilted environment for the two groups. Both the S&B and the S groups showed statistically significant improvements in MVC during both isokinetic velocities. Several subjects in the S&B group reported subjectively that they perceived improvement in their ability to control posture following the training. Measures of balance control confirmed such an improvement. Overall, effects on postural parameters were mainly seen in the mediolateral direction, specific to the direction of postural challenge in the tilted room during training.

Figure 9:
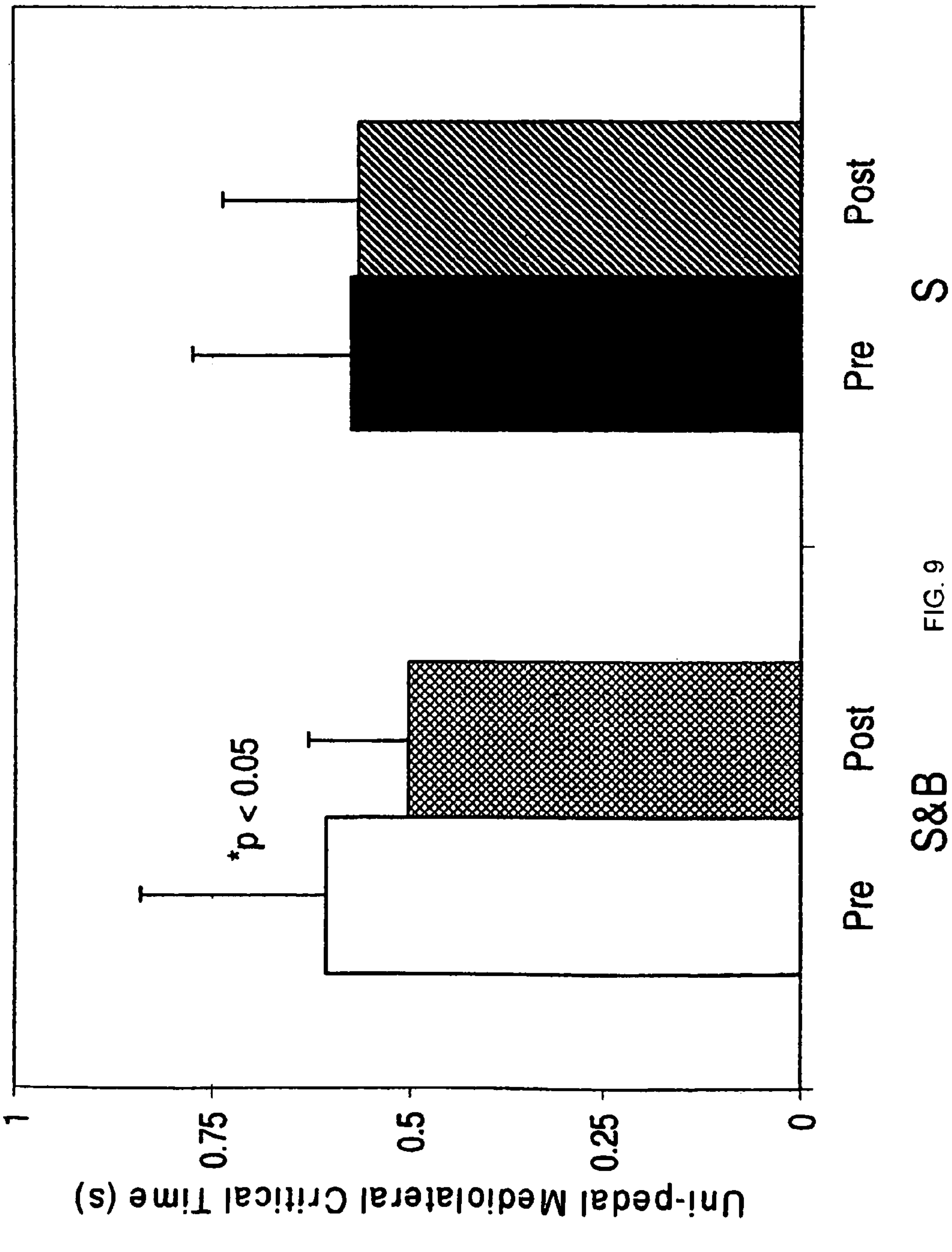
FIG. 9 depicts pre- and post-training results of the mediolateral critical time parameter, which indicates an improved ability to quickly correct and control balance tested in an upright position with respect to gravity.

FIG. 9 shows the mediolateral critical time parameter for eyes-closed conditions from the Stabilogram-Diffusion analysis. This parameter indicates the time interval at which, on average, the random walk behavior of the COP changes from being predominantly persistent (tendency to continue moving in the same direction) to being predominantly anti-persistent (tendency to reverse direction). The critical time parameter was 105 ms shorter after training for the S&B group ($p<0.05$,) with a non-significant decrease of 9 ms in the S group. A similar, although non-significant, decrease was seen with eyes open in the S&B group ($p<0.14$).

The combined S&B training appeared to alter the relationship between balance performances under eyes closed vs. eyes open (Romberg ratio). The Critical Displacement parameter, indicating the average COP displacement at which the postural control process becomes mainly antipersistent, was five times higher under eyes closed compared to eyes open pre-training for the S&B group and decreased by 30% to 3.5 post-training ($p<0.04$). There was a small non-significant decrease in the S group (6%). A post-training decrease in the S&B group of 21% ($p<0.03$) was seen for the ratio between mediolateral short-term diffusion coefficients indicating a relatively lower short-term stochastic activity under eyes closed conditions as a result of the training. This was mainly related to a 40% increase in mediolateral short-term stochastic activity under open eyes conditions ($p<0.012$). No change was observed for the S group.

The foregoing results support the view that combined strength and balance training in a tilted environment, where the vestibular tilt orientation mechanism cannot be used for balancing, can improve balance function during upright while balancing against gravity in addition to muscular strength. Thus patients undergoing rehabilitation can target postural control and may improve training efficiency by a multimodal regimen where strength training is performed under conditions where balance is challenged.

The present invention has been described with reference to several embodiments. The foregoing detailed description and examples have been given for clarity of understanding. No unnecessary limitations are to be understood therefrom. It will be apparent to those skilled in the art that many changes can be made in the embodiments described without departing from the scope of the invention. Thus, the scope of the invention is not intended to be limited to the structures described herein, but only the language of the claims and its equivalents.

What is claimed is:

1. A system for functional rehabilitation of at least one of strength and balance in a mammalian subject, the system comprising:

(a) a substantially flat surface plate capable of supporting a mammalian subject in a supine position;

(b) a frame operably connected to said surface plate by at least one air bearing disposed on said frame, the frame structured to be attached to the mammalian subject and the at least one air bearing being adapted to provide a uniform or substantially uniform air pressure exerted on said surface plate;

(c) an exercise tool operably connected to said surface plate, said exercise tool positioned along an axis perpendicular to said surface plate and in operable contact with said subject;

(d) an air pressure control system for providing air at a predetermined controllable pressure to the plurality of air bearings;

(e) a cable having first and second ends, said first end connected to said frame and said second end threaded through a pulley system and connected to a force actuator for simulating a pseudo-gravitational force on the mammalian subject in the supine position; and (f) a system of pulleys supporting said cable and operably connected to a linear bearing assembly, said linear bearing assembly operably attached to an edge of said surface plate, said linear bearing assembly allowing unrestricted mediolateral movement of the cable thereby providing a gravity-like load that maintains a direction perpendicular to the exercise tool with which the mammalian subject is in contact.

2. The system of claim 1 further comprising visual display means for providing the supinely-oriented mammalian subject a three-dimensional visual image of said mammalian subject in a virtual, vertical orientation.

3. The system of claim 1 further wherein said surface plate is operably connected to a mobile hospital bed.

4. The system of claim 1 wherein said surface plate is frictionless.

5. The system of claim 1 further comprising at least one wall connected to said friction-free surface plate, said at least one wall including objects for providing visual polarity.

6. The system of claim 1 wherein said system is stationary.

7. The system of claim 1 wherein said system is moveable.

8. The system of claim 1 wherein said linear bearing assembly includes a linear bearing operably supported by a linear guide rail on which said linear bearing travels.

9. The system of claim 1 wherein said air pressure control system is a closed-loop control system.

10. The system of claim 1 wherein said air pressure control system is an open-loop control system.

11. The system of claim 10 wherein said system further includes an air tank operably connected to said force actuator.

12. The system of claim 1 wherein said force actuator comprises a pneumatic cylinder.

13. The system of claim 1 wherein said force actuator comprises a weight stack.

14. The system of claim 1 wherein said exercise tool is selected from the group consisting of treadmills, steppers, cycles, and balance boards.

15. The system of claim 1 wherein the output of said force actuator is passively regulated.

16. The system of claim 1 wherein said at least one air bearing includes a plurality of air bearings.

17. The system of claim 16 wherein said plurality of air bearings include three air bearing positioned on said frame to form a substantially isosceles triangle with a base perpendicular to the subject's long body axis at the lower lumbar level.

18. A method of providing functional rehabilitation of at least one of strength and balance in a mammalian subject, the method comprising:

(a) providing a substantially flat surface plate capable of supporting a mammalian subject in a supine position;

(b) providing a frame operably connected to said surface plate by at least one air bearing disposed on said frame, the frame structured to be attached to the mammalian subject and the at least one air bearing being adapted to provide a uniform or substantially uniform air pressure exerted on said surface plate;

(c) providing an exercise tool operably connected to said surface plate, said exercise tool positioned along an axis perpendicular to said surface plate and in operable contact with said subject;

(d) providing an air compressor for providing air at a predetermined controllable pressure to the plurality of air bearings;

(e) providing a cable having first and second ends, said first end connected to said frame and said second end threaded through a pulley system and connected to a force actuator for simulating a pseudo-gravitational force on the mammalian subject in the supine position; and (f) providing a system of pulleys supporting said cable and operably connected to a linear bearing assembly, said linear bearing assembly operably attached to an edge of said surface plate, said linear bearing assembly allowing unrestricted mediolateral movement of the cable thereby providing a gravity-like load that maintains a direction perpendicular to the exercise tool on which the mammalian subject is training.

19. The method of claim 18 further comprising providing visual display means for providing the supinely-oriented mammalian subject a three-dimensional visual image of said mammalian subject in a virtual, vertical orientation.

20. The system of claim 18 further comprising providing at least one wall connected to said friction-free surface plate, said at least one wall including objects for providing visual polarity.

21. A system for functional rehabilitation of at least one of strength and balance in a mammalian subject, the system comprising:

(a) a support frame structured to be attached to the mammalian subject for supporting said mammalian subject in an upright position;

(b) an exercise tool in operable contact with said subject;

(c) a structural frame surrounding said exercise tool;

(d) a linear bearing directly or indirectly slidably coupled to said structural frame; and (e) a cable having first and second ends, said first end connected to said support frame attached to the mammalian subject and said second end operably coupled to said linear bearing, said linear bearing structured to slide to a first lateral position substantially perpendicular to a longitudinal axis of the exercise tool and to a second lateral position substantially perpendicular to the longitudinal axis of the exercise tool in response to movement of the mammalian subject thereby allowing the mammalian subject to make mediolateral postural adjustments in response to a challenge to balance emulating a gravity-like load.

22. The system of claim 21 wherein said linear bearing is operably supported by a linear guide rail on which said linear bearing travels.

23. The system of claim 22 wherein said linear guide rail is attached to said structural frame.

* * * * *